(12) United States Patent
Schick et al.

(10) Patent No.: US 10,661,766 B2
(45) Date of Patent: *May 26, 2020

(54) HYDRAULIC TRAILER BRAKE CIRCUIT FOR ADJUSTABLE GAIN AND IMPROVED STABILITY

(71) Applicant: DEERE & COMPANY, Moline, IL (US)

(72) Inventors: Troy E. Schick, Cedar Falls, IA (US); Ryan A. Pence, Cedar Falls, IA (US); Brandon J. McMillen, Cedar Falls, IA (US); Jordan Tagtow, Waterloo, IA (US); Aaron M. Quinn, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/197,453

(22) Filed: Nov. 21, 2018

(65) Prior Publication Data
US 2019/0084535 A1 Mar. 21, 2019

Related U.S. Application Data

(62) Division of application No. 15/222,097, filed on Jul. 28, 2016, now Pat. No. 10,173,652.

(51) Int. Cl.
*B60T 8/17* (2006.01)
*B60T 15/02* (2006.01)
(Continued)

(52) U.S. Cl.
CPC ........... *B60T 8/1708* (2013.01); *B60T 11/108* (2013.01); *B60T 13/68* (2013.01); *B60T 15/027* (2013.01); *B60T 15/028* (2013.01)

(58) Field of Classification Search
CPC ...... B60T 8/1708; B60T 11/108; B60T 13/68; B60T 15/027; B60T 15/028
See application file for complete search history.

(56) References Cited

U.S. PATENT DOCUMENTS 4,685,745 A * 8/1987 Reinecke .............. B60T 8/1708
303/112
4,833,880 A * 5/1989 Chapin ..................... F02C 9/26
137/565.35
(Continued)

FOREIGN PATENT DOCUMENTS

JP   H01164655 A   6/1989
JP   H10236299 A   9/1998

OTHER PUBLICATIONS

European Patent Office; Extended European Search Report issued in Application No. 17178859.9; dated Jan. 18, 2018; 7 pages.

*Primary Examiner* — Bradley T King
*Assistant Examiner* — James K Hsiao
(74) *Attorney, Agent, or Firm* — Taft Stettinius & Hollister LLP; Stephen F. Rost

(57) ABSTRACT

A braking system of a work machine includes a pressurized fluid supply, a base valve fluidly coupled to the supply, a proportional control valve fluidly coupled to the supply, and a fluid output configured to be fluidly coupled to a braking system of a trailer. A first fluid path is selectively fluidly coupling the supply to the fluid output via the base valve, and a second fluid path is selectively fluidly coupling the supply to the fluid output via the proportional control valve. The base valve includes a predefined fixed gain and the proportional control valve includes an adjustable ratio.

19 Claims, 5 Drawing Sheets

(51) Int. Cl.
*B60T 11/10* (2006.01)
*B60T 13/68* (2006.01)

(56) References Cited

U.S. PATENT DOCUMENTS

| | | | |
|---|---|---|---|
| 6,652,038 B1 | 11/2003 | Frye | |
| 7,517,026 B1 * | 4/2009 | Herbst | B60T 7/20 |
| | | | 303/113.4 |
| 8,240,777 B2 * | 8/2012 | Heren | B60T 13/686 |
| | | | 188/112 R |
| 8,820,855 B2 * | 9/2014 | Cadaddu | B60T 8/4004 |
| | | | 188/345 |
| 8,974,011 B2 | 3/2015 | Schick et al. | |
| 9,434,366 B1 | 9/2016 | Taneyhill et al. | |
| 9,561,784 B2 * | 2/2017 | Casali | B60T 7/04 |
| 9,802,593 B2 * | 10/2017 | Frashure | B60T 13/662 |
| 9,873,415 B2 * | 1/2018 | Hill | B60T 8/1708 |
| 2002/0180257 A1 | 12/2002 | Gill et al. | |
| 2012/0062022 A1 * | 3/2012 | Heren | B60T 11/21 |
| | | | 303/2 |
| 2013/0038118 A1 * | 2/2013 | Brinkley | B62D 11/08 |
| | | | 303/9.62 |
| 2013/0127239 A1 * | 5/2013 | Brenninger | B60T 11/21 |
| | | | 303/9.61 |

\* cited by examiner

HYDRAULIC TRAILER BRAKE CIRCUIT FOR ADJUSTABLE GAIN AND IMPROVED STABILITY

RELATED APPLICATIONS

This application is a divisional application of U.S. patent application Ser. No. 15/222,097, filed Jul. 28, 2016, the disclosure of which is hereby incorporated by reference in its entirety.

FIELD OF THE DISCLOSURE

The present disclosure relates to a trailer hydraulic brake control circuit, and in particular, to a hydraulic brake control circuit with adjustable gain and increased stability.

BACKGROUND OF THE DISCLOSURE

Tractor trailer combinations generally require a braking system on the trailer that is engaged when a braking system of the tractor is selectively engaged. Often the braking system of the trailer is coupled to the braking system of the tractor to allow the tractor to simultaneously apply the braking system of the tractor and the trailer. Current trailer brake control circuits typically utilize a single trailer brake valve with a fixed hydraulic gain. When the brakes of the tractor are applied, a pilot pressure controls the single trailer brake valve. The single trailer brake valve provides hydraulic fluid and pressure to the braking system of the trailer under fixed gain conditions.

SUMMARY

In one embodiment of the present disclosure, a braking system of a work machine includes a pressurized fluid supply; a base valve fluidly coupled to the supply; a proportional control valve fluidly coupled to the supply; a fluid output configured to be fluidly coupled to a braking system of a trailer; a first fluid path selectively fluidly coupling the supply to the fluid output via the base valve; a second fluid path selectively fluidly coupling the supply to the fluid output via the proportional control valve; wherein, the base valve comprises a predefined fixed gain and the proportional control valve comprises an adjustable gain.

In a first example of this embodiment, the braking system includes a shuttle valve fluidly coupled between the base valve, the proportional control valve, and the fluid output, where the shuttle valve is movable in response to a difference between a first pressure in the first flow path and a second pressure the second flow path. In a second example, a solenoid valve is disposed in fluid communication between the proportional control valve and the fluid output, where the solenoid valve is movable between an open position in which the proportional control valve is fluidly coupled to the fluid output, and a closed position in which the proportional control valve is not fluidly coupled to the fluid output. In a third example, the braking system includes a controller; and a solenoid of the solenoid valve disposed in electrical communication with the controller, where movement of the solenoid valve between its open and closed positions is controlled by the controller.

In a fourth example, the braking system includes a controller; a service brake valve in fluid communication with the base valve, the service brake valve configured to provide fluid upon actuation of a service brake of the work machine; a sensor disposed in electrical communication with the controller, the sensor configured to detect a brake pressure from the service brake valve; wherein, the proportional control valve is operably controlled by the controller to provide an output gain as a function of the brake pressure. In a fifth example, the controller receives a valve set ratio and operably controls an output of the proportional control valve as a function of the brake pressure and valve set ratio. In a further example, the controller operably controls the proportional control valve according to a variable current that is proportional to the brake pressure.

In another embodiment of this disclosure, a method of controlling pressurized fluid to a trailer brake system includes providing a controller, a fluid supply, a work machine brake system, a brake output in fluid communication with the trailer brake system, a base valve having a preset fixed gain fluidly coupled between the fluid supply and the brake output, a proportional control valve fluidly coupled to the fluid supply, a solenoid valve, and a shuttle valve; fluidly coupling the work machine brake system to the base valve via a pilot line; generating a base valve output pressure based on a fluid pressure in the pilot line and the preset fixed gain; identifying, with the controller, a valve set ratio for the proportional control valve; detecting a brake pressure in the work machine brake system with a sensor; communicating the brake pressure to the controller via the sensor; determining a brake command by the controller as a function of the brake pressure and the valve set ratio; controlling an output pressure of the proportional control valve with the controller as a function of the valve set ratio and the brake command; and producing fluid pressure to the brake output based on the greater of the output pressure of the proportional control valve and the base valve output pressure.

In one example of this embodiment, the method may include providing a first brake and a second brake of the work machine brake system, the first brake generating a first brake pressure and the second brake generating a second brake pressure; fluidly coupling a first sensor to the first brake for detecting the first brake pressure and a second sensor to the second brake for detecting the second brake pressure, wherein the first sensor and the second sensor are electrically coupled to the controller; wherein, the determining step comprises calculating the brake command as a function of the first brake pressure, the second brake pressure, and the valve set ratio. In a second example, the determining step includes multiplying the valve set ratio by an average of the first and second brake pressures. In a third example, the determining step comprises multiplying the valve set ratio by either the higher or lower of the first and second brake pressures.

In a fourth example, the controlling step includes calculating the brake command as a function of the first brake pressure, the second brake pressure, and the valve set ratio; comparing the brake command to the valve set ratio; and outputting a current to the proportional control valve based on the greater of the brake command and the valve set ratio. In a fifth example, the controlling step includes determining an amount of current in proportion to the detected brake pressure; and sending the amount of current by the controller to the proportional control valve; wherein, the amount of current is adjustable based on the valve set ratio. In a sixth example, the method may include providing the solenoid valve in fluid communication between the proportional control valve and the fluid output, where the solenoid valve includes a solenoid disposed in electrical communication with the controller; and operably controlling movement of the solenoid valve between an open position and a closed position, wherein in the open position the output pressure of the proportional control valve is fluidly coupled to the brake output, and in the closed position the output pressure of the proportional control valve is not fluidly coupled to the brake output. In another example, the producing step comprises actuating the shuttle valve based on the greater of the output pressure of the proportional control valve and the base valve output pressure.

In a further embodiment of this disclosure, a braking system of a tractor trailer combination includes a pressurized fluid supply; a first brake and a second brake of the tractor, the first brake providing a first brake pressure and the second brake providing a second brake pressure; a shuttle valve disposed in fluid communication with the first brake pressure and the second brake pressure; a base valve fluidly coupled to the supply, the base valve including an inlet and an outlet, where the inlet is fluidly coupled to the first shuttle valve for receiving the greater of the first brake pressure and the second brake pressure; a proportional control valve fluidly coupled to the supply; a fluid output configured to be fluidly coupled to a braking system of a trailer; a first fluid path selectively fluidly coupling the supply to the fluid output via the base valve; and a second fluid path selectively fluidly coupling the supply to the fluid output via the proportional control valve; wherein, the base valve comprises a fixed gain and the proportional control valve comprises an adjustable gain.

In one example of this embodiment, the system may include a second shuttle valve fluidly coupled between the base valve, the proportional control valve, and the fluid output, where the shuttle valve is movable in response to a difference between a first pressure output by the base valve and a second pressure output by the proportional control valve. In a second example, the system may include a solenoid valve disposed in fluid communication between the proportional control valve and the fluid output, where the solenoid valve is movable between an open position in which the proportional control valve is fluidly coupled to the fluid output, and a closed position in which the proportional control valve is not fluidly coupled to the fluid output. In a third example, the system may include a controller; a sensor disposed in electrical communication with the controller, the sensor configured to detect the first and second brake pressures; wherein, the proportional control valve is operably controlled by the controller to provide an output gain as a function of the first and second brake pressures. In a further example, the system may include an operator display for communicating a valve set ratio to the controller; wherein, a brake command is determined by the controller as a function of the valve set ratio, the first brake pressure, and the second brake pressure; further wherein, when neither the first brake or second brake produce any brake pressure, the output of the proportional control valve is based on the valve set ratio.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
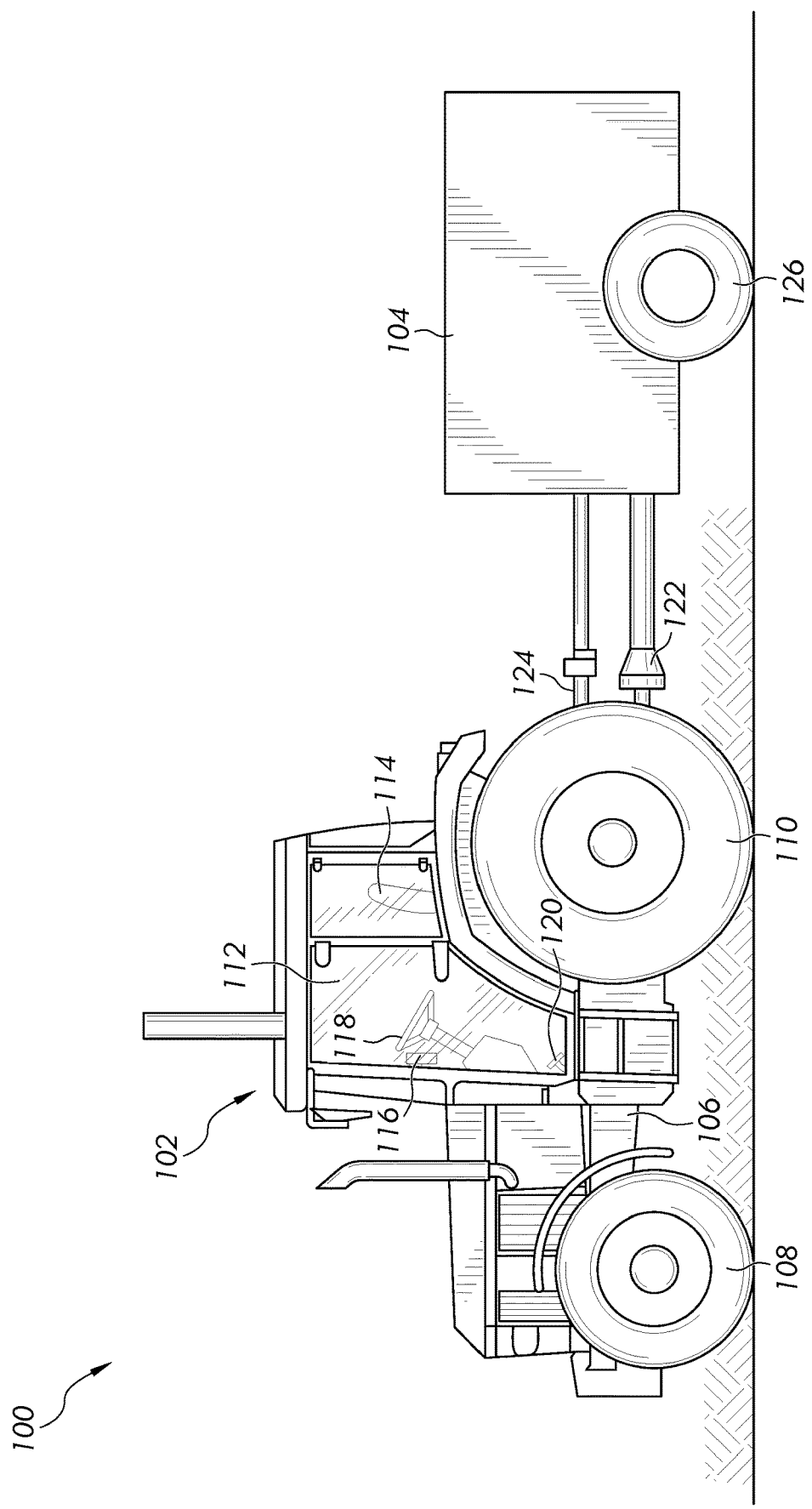
FIG. 1 is a side view of a combined tractor and trailer system.

Referring to FIG. 1, a combined tractor trailer system 100 is shown. In this system, a tractor 102 is shown coupled to and pulling a trailer 104. The tractor 102 may have a chassis 106 that spans between a front ground engaging mechanisms 108 and a rear ground engaging mechanisms 110. In the embodiment of FIG. 1, each ground-engaging mechanism is in the form of a wheel defined along a respective axle, i.e., a front axle and a rear axle. In other embodiments, however, the ground-engaging mechanism may be a track that propels the tractor 102 along a ground surface. Likewise, the trailer 104 may also include at least one ground-engaging mechanism such as a wheel 126.

A cab 112 may be coupled to the chassis 106 and define a location for an operator to be positioned in an operator's seat 114. From the cab, the operator may control the tractor 102 and trailer 104 via a plurality of controls. As shown, the cab 112 may include a display 116 or dashboard that visually shows control characteristics of the tractor 102 or trailer 104 such as speed, power, temperature, pressure, direction, and any other type of control characteristic. The display 116 may be a touchscreen display that includes one or more operator controls for selectively controlling the operation of the tractor 102 or trailer 104. Other controls may include a steering wheel or yoke 118, a pedal 120 (e.g., a brake pedal, clutch pedal, or throttle pedal), any other type of control such as a joystick, switch, lever, knob, etc. for controlling the tractor trailer system 100.

While a tractor 102 is shown and described herein, any type of work machine may utilize the teachings of this disclosure and therefore it is not intended to be limited to applying to only tractors. In other embodiments, a truck configured to tow a trailer may utilize the teachings of this disclosure. Accordingly, the tractor 102 can be any type of work machine used to pull a trailer.

The tractor 102 may be coupled to the trailer 104 through a hitch member or drawbar 122. The hitch member or drawbar 122 may be sufficiently strong to transfer motion of the tractor 102 to the trailer 104. In one embodiment, when the tractor 102 travels in a forward direction, the hitch member 122 pulls the trailer 104 along therewith in approximately the same direction.

One or more fluid lines 124 may also be provided. For purposes of this disclosure, a fluid may include a gas or liquid. Thus, any pneumatic or hydraulic line may be referred to as a fluid line herein. The one or more fluid lines 124 may selectively fluidly couple a tractor brake system to a trailer brake system. More specifically, the tractor 102 may provide a trailer brake output that is coupled to the trailer brake system. In this configuration, when the user initiates a brake command, both the tractor brake system and the trailer brake system may simultaneously engage to slow the tractor 102 and trailer 104.

In some tractor trailer systems, one or more brake pedals may be engaged by an operator to apply a tractor service brake. Brake actuators may be pressurized to apply the brakes, which will be described in greater detail below with reference to FIG. 2. Once the operator commands engagement of the tractor braking system, the trailer braking system also engages to prevent the trailer from contacting or running into a back end of the tractor. In many conventional braking systems, there may be a single hydraulic line that connects between the tractor and trailer braking systems. In addition, a single hydraulic trailer brake valve may have a fixed gain associated with it due to its geometry. Thus, depending upon the fixed gain, an amount of pressure entering the valve is multiplied by the fixed gain to deliver a predetermined outlet pressure. As braking systems change and new federal and international guidelines or standards change, there is a need for both lower and higher outlet pressures depending upon the type of trailer. As a result, an adjustable gain across the hydraulic trailer brake valve is desirable over a fixed gain. Other needs and advantages will become apparent from the principles and teachings of the present disclosure.

Figure 2:
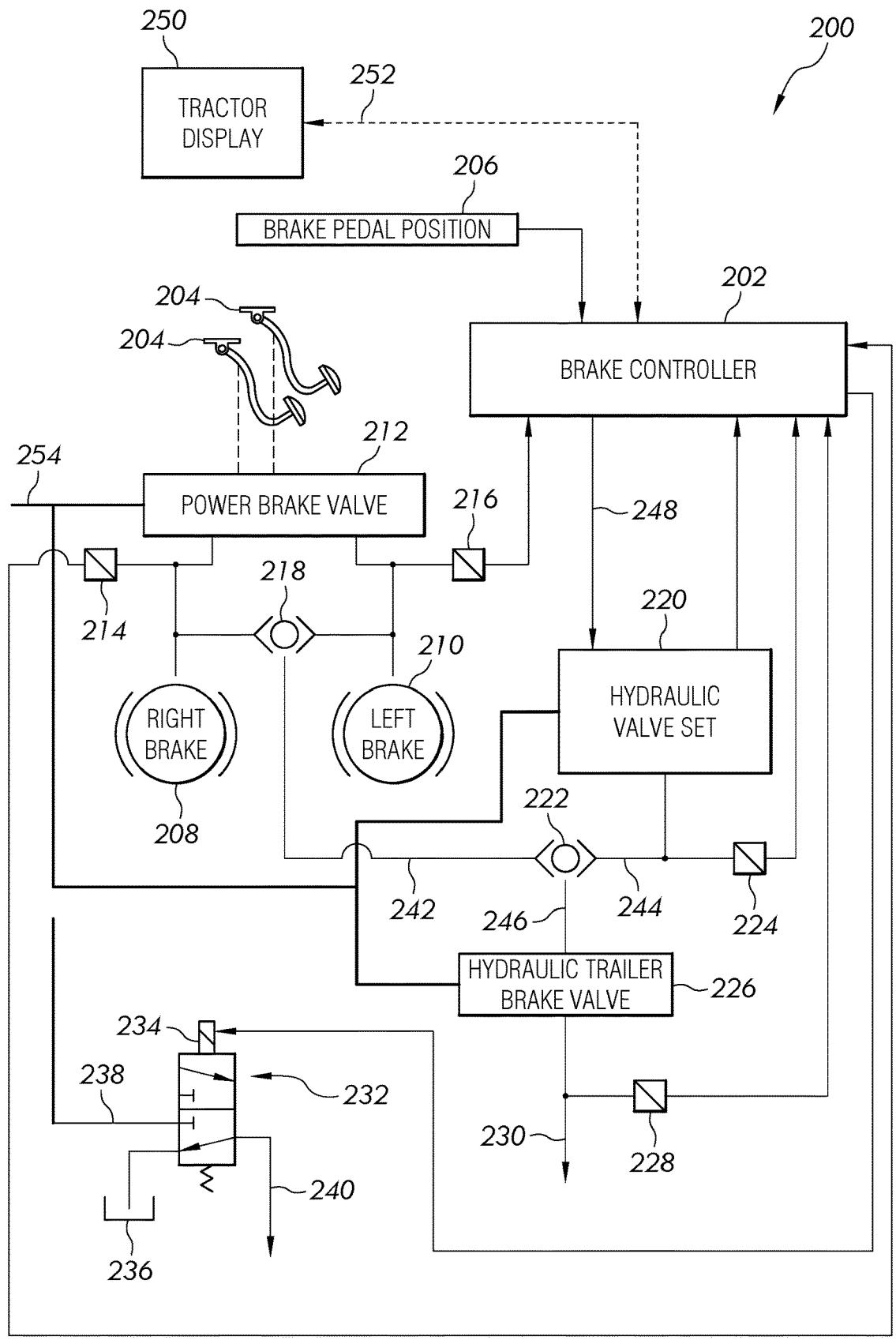
FIG. 2 is a control schematic view of a hydraulic system of a combined tractor and trailer brake system.

In some tractor trailer systems, the trailer braking system includes a hydraulic braking system, a pneumatic braking system, or a combination thereof. An example of a hydraulic trailer brake system is shown in FIG. 2. In this embodiment, a hydraulic braking system 200 of a tractor and a trailer may include a brake controller 202 as shown. The brake controller 202 may be in electrical communication with a vehicle controller (not shown), an engine controller (not shown), a transmission controller (not shown), and any other type of controller for controlling the tractor or trailer. The brake controller 202 may include a plurality of inputs and outputs for receiving and communicating electrical signals or commands to different components within the braking system 200. In FIG. 2, for example, the brake controller 202 may be disposed in electrical communication with a tractor display 250. This communication may exist over a controller area network (CAN) bus 252 or communication link. The display 250 may allow an operator to selectively communicate instructions to the brake controller 202 for controlling the tractor braking system or the trailer braking system 200.

Other operator controls may also be in communication with the brake controller 202. For example, one or more brake pedals 204 may be selectively engaged by an operator. A brake position sensor 206 may detect a movement of the one or more brake pedals 204 and communicate this movement to the brake controller 202. Upon application of the one or more brake pedals 204, a brake valve 212 may be triggered such that fluid from a hydraulic supply line 254 (via a pump or other pressure source) is delivered to brake actuators. In turn, the brake actuators are controllably actuated to deliver hydraulic brake pressure to the tractor braking system to control the speed of the tractor. In FIG. 2, the braking system 200 illustrates a right brake actuator 208 and a left brake actuator 210. In this embodiment therefore the operator may depress a right brake pedal and a left brake pedal to engage the tractor braking system. The right brake pedal and right brake actuator 208 may control brake pressure to a service brake on the right, rear wheel of the tractor, and the left brake pedal and left brake actuator 210 may control brake pressure to a service brake on the left, rear wheel of the tractor. In doing so, the right brake actuator 208 and left brake actuator 210 deliver hydraulic pressure to the tractor service brakes to slow the vehicle. This hydraulic pressure may also be delivered to the trailer braking system as will be described below.

As is known, an operator may apply the brake pedals to brake the tractor and slow its speed. In addition, an operator may gently apply or tap on the brake pedal, as is often the case with an operator desiring to disable cruise control in a motor vehicle. In the tractor trailer system, it may be desirable to begin braking the trailer as soon as the brake controller 202 detects engagement of the one or more brake pedals 204. In this example, the brake controller 202 may execute a pre-brake routine or algorithm to begin applying the trailer braking system. In the embodiment of FIG. 2, the brake pedal position sensor 206 can send a signal to the brake controller 202 indicating that the operator has begun to depress the pedals 204. Before any brake pressure or a substantial amount of brake pressure is generated, the brake controller 202 may execute the pre-brake routine and send a signal to the trailer braking system to begin braking the trailer. This signal may be an adjustable or proportional signal from the brake controller 202. The signal may be received by a trailer brake valve that includes a first solenoid valve and a second 2-way position valve (i.e., an on/off valve). In one example, up to seven bars of pressure may be output from the valve to the trailer brakes to begin a braking operation.

During this pre-brake routine, the first solenoid valve may receive the signal from the brake controller and deliver the hydraulic pressure to the trailer brakes. The second, 2-way position valve may be disposed in its open position to allow fluid pressure to pass through. However, if there is a failure detected in the system, the second, 2-way position valve can be actuated to its off or closed position to block fluid pressure to the trailer brake system. This "fail-silent" condition may be utilized to protect against possible failures in the system. In any event, hydraulic pressure may still pass through a main hydraulic trailer brake valve 226 (FIG. 2) so that the trailer braking system is engaged during a braking operation. The pre-brake valve set, however, may be disabled or closed so that no output pressure passes through the valve set to the trailer brakes.

In FIG. 2, hydraulic brake pressure from the right brake actuator 208 may be detected by a first pressure transducer 214, and from the left brake actuator 210 may be detected by a second pressure transducer 216. The first and second transducers may be in electrical communication with the brake controller 202. This electrical communication may be either wired or wireless communication, or any other known or to be developed form of communication. As a result, the brake controller 202 can monitor brake pressure from both actuators.

A shuttle valve 218 may be disposed in fluid communication with the right brake actuator 208 and the left brake actuator 210. The shuttle valve 218 may be actuated in either direction depending upon which brake pressure is the greatest. As such, the greater of the two brake pressures passes through the shuttle valve 218 and is referred to as brake pilot pressure. In FIG. 2, the brake pilot pressure flows downstream from the shuttle valve 218 along a brake pilot line 242.

The braking system 200 of FIG. 2 may also include a hydraulic valve set 220. This valve set 220 may be similar to the aforementioned pre-brake valve set in that it includes both a proportional solenoid valve and a 2-way shutoff valve. As shown, the brake controller 202 may be in electrical communication with the hydraulic valve set 220 to control its operation. For example, a trailer brake command 248 may be communicated from the brake controller 202 to the valve set 220. Moreover, the valve set 220 may send signals to the brake controller 202 in response to its operation (i.e., a pressure transducer 224 may communicate a pressure associated with the valve set to the controller 202).

Outlet pressure from the hydraulic valve set 220 may flow through a fluid line 244 as shown in FIG. 2. The hydraulic valve set fluid line 244 and the brake pilot line 242 may converge upon a second shuttle valve 222. Similar to the operation of the first shuttle valve 218, the greater of the brake pilot pressure and hydraulic valve set pressure may pass through the second shuttle valve 222 and enter hydraulic line 246. The pressure in hydraulic line 246 may be referred to as the hydraulic pilot pressure. A pressure transducer 228 can detect the hydraulic pilot pressure and communicate this pressure to the brake controller 202, as shown in FIG. 2. This hydraulic pilot pressure may pass through a hydraulic trailer brake control line 230 to the trailer brakes.

In the system 200 of FIG. 2, the trailer may also include a trailer park brake. The trailer park brake may be operably controlled via a hydraulic trailer park control valve 232. This valve 232 may include a solenoid 234 that is in electrical communication with the brake controller 202. The hydraulic trailer park control valve 232 may be biased to its vented position to allow pressure to flow through a supplementary hydraulic line 240. The valve 232 may also be in fluid communication with a tank or reservoir 236 as shown. As such, hydraulic pressure may be delivered from a supply line 238 to the hydraulic trailer park control valve 232, and in its normally or biased open position, pressure passes therethrough to the hydraulic trailer brake supplementary line 240.

Figure 3:
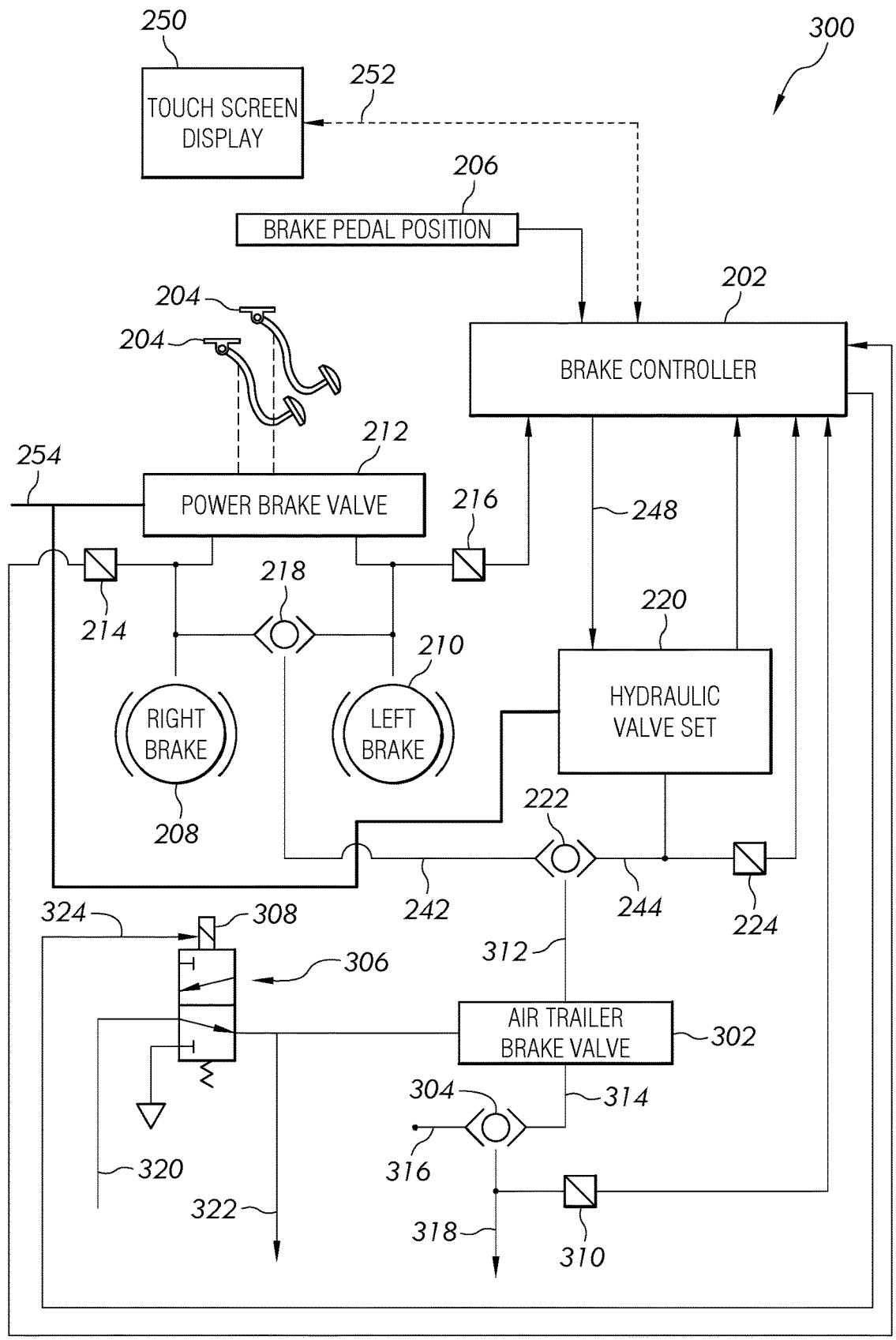
FIG. 3 is a control schematic view of a combined hydraulic and pneumatic system of a combined tractor and trailer brake system.

Referring to FIG. 3, a portion of the braking system 200 of FIG. 2 is removed and an air or pneumatic trailer braking system 300 is shown. As described above, the trailer braking system may be hydraulic, pneumatic, or a combination thereof. In this disclosure, the pneumatic trailer braking system may use any form of gas for controlling its brakes. However, for sake of simplicity, the type of gas will be referred to as air through the remainder of this disclosure. Thus, the pneumatic trailer braking system 300 will be referred to as the air trailer braking system 300, but it is to be understood that any type of gas may be used to control the trailer brakes.

In FIG. 3, the air trailer braking system 300 may include an air or pneumatic trailer brake valve 302. The air trailer brake valve 302 may be located downstream from the second shuttle valve 222 of the hydraulic system 200 such that hydraulic pressure is used as an inlet to control the valve 302. Hydraulic pressure may flow through a pilot pressure line 312 to an inlet of the air trailer brake valve 302.

In addition to the air trailer brake valve 302, the air trailer braking system 300 may also include an air supply line 320, a shuttle valve 304, an air trailer park brake control valve (not shown), and a leak detect valve 306. The shuttle valve 304 is disposed downstream of the air trailer brake valve 302 and the air trailer park brake control valve. Thus, air pressure may be output from the air trailer brake valve 302 via a first pressure line 314 and from the air trailer park brake control valve via a second pressure line 316. The greater of the two pressures from the first and second line may trigger the shuttle valve 304 open so that air pressure can flow through a first air trailer brake control line 318 to the air trailer brakes. A pressure transducer 310 may be in fluid communication with the control line 318 to detect the pressure and communicate it to the brake controller 202.

The leak detect valve 306 may be in the form of a normally open solenoid control valve. The valve 306 may include a solenoid 308 that is disposed in electrical communication with the brake controller 202. As such, the brake controller 202 can control the leak detect valve 306 between its open and closed positions via a communication link 324 with the solenoid 308.

Air pressure may be supplied via the supply line 320 to the leak detect valve 306. Since the leak detect valve 306 may be biased to its open position, fluid may flow through the valve 306 to the air trailer brake valve 302 and to an air trailer brake supply line 322.

The embodiments of FIGS. 2 and 3 are illustrative of only one example of a braking system for a tractor trailer combination. Other embodiments of a braking system is possible and within the scope of this disclosure. For instance, another embodiment may include one or more electrohydraulic secondary brake valves.

Figure 4:
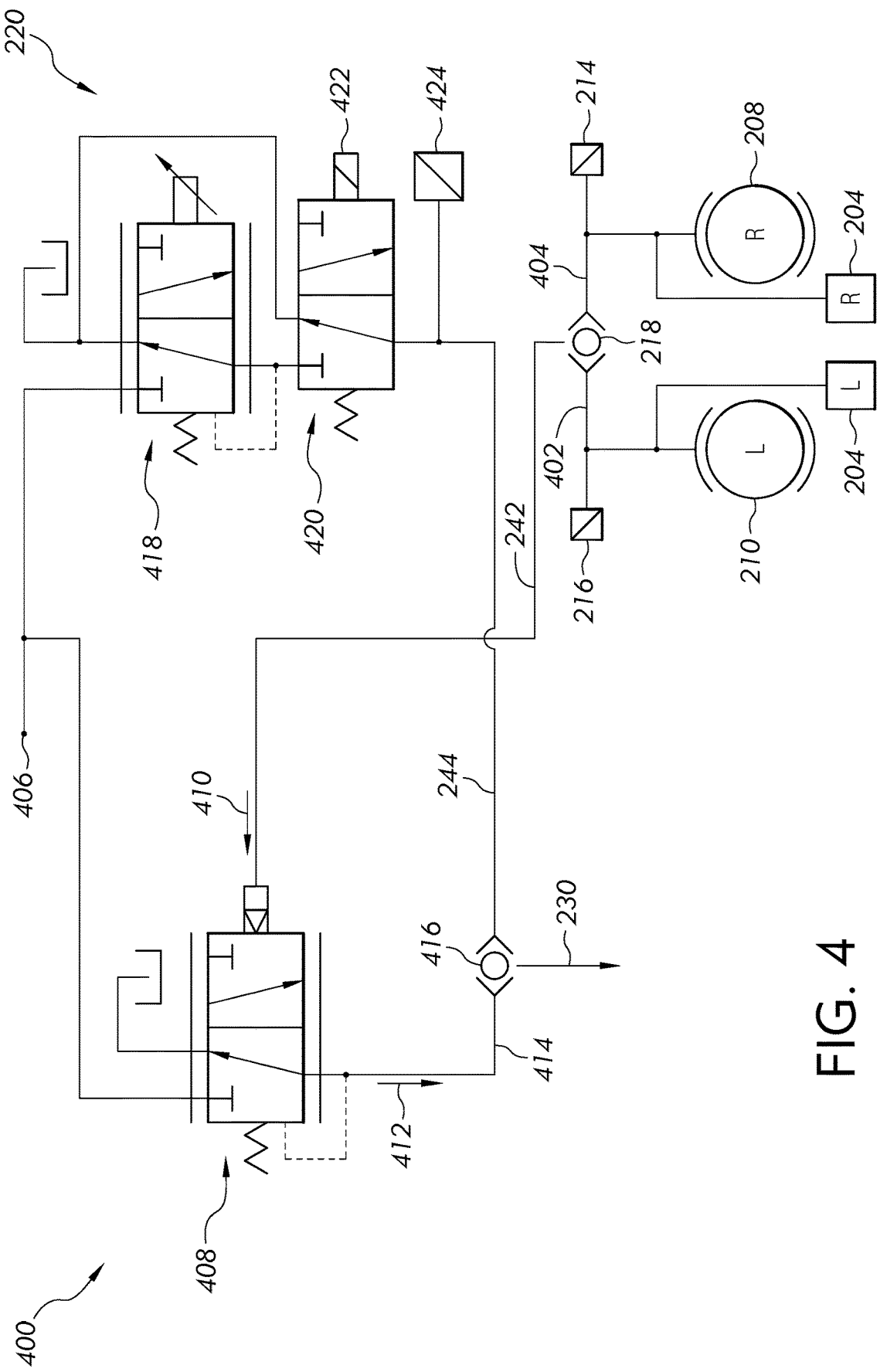
FIG. 4 is a hydraulic control circuit of a combined tractor and trailer brake system.

Referring to FIG. 4, a hydraulic trailer brake control circuit 400 is provided for achieving adjustable gain and improved stability. As will be described, an output of the hydraulic valve set 220 is combined with the output of the hydraulic trailer brake valve 226, and the greater of the two outputs operably shifts a shuttle valve to provide hydraulic fluid to a trailer brake coupler. In other words, two independent hydraulic lines provide a hydraulic fluid to a shuttle valve, and the greater of the two pressures is output to the hydraulic trailer brake coupler.

As previously described, conventional trailer brake valves are designed with a fixed gain such that an outlet pressure is a fixed ratio of the inlet pressure based on the gain. There is a need, however, for a lower hydraulic trailer brake gain under new international standards. This may be problematic with older trailers that have a low brake capacity, because a lower trailer brake valve gain can cause increased tractor brake wear and poor braking control (i.e., tractor pushing). Thus, to be able to pull both newer and older trailers, an adjustable trailer brake system is desired such that the gain may be adjusted depending upon the type of trailer being towed. Moreover, hydraulic trailer brake valves can be unstable since they amplify pressure in the range of 3 to 17 times the inlet pressure. Lower amplification valves tend to be more stable than higher amplification valves, and thus a control circuit such as the one in FIG. 4 is desirable as it can utilize the lowest possible amplification to satisfy certain standards and yet still be adjustable to a higher amplification for older trailers.

In the control circuit 400 of FIG. 4, a low amplification trailer brake valve 408 may be provided in direct fluid communication with the brake pedals 204 and the right brake actuator 208 and the left brake actuator 210. In particular, the trailer brake valve 408 may have a fixed gain that is predefined to meet any regulation for low amplification pressures. In this embodiment, a left brake pressure 402 and a right brake pressure 404 may be provided as the operator depresses the left and right service brake pedals 204. The first shuttle valve 218 is located upstream of the brake pedals 204 and actuators, which is similar to the embodiment depicted in FIG. 2. Depending upon which of the left brake pressure 402 and the right brake pressure 404 is greatest, the shuttle valve 218 may be actuated to either side to allow the greater pressure to flow therethrough to the brake pilot line 242. In this manner, a brake pilot pressure flows through the pilot line 242 in an inlet direction as shown by arrow 410.

The brake pilot pressure may then be multiplied by the fixed gain of the hydraulic trailer brake valve 408 to produce an outlet pressure that flows through an outlet line 414 in a downstream direction 412. The outlet pressure flows through the outlet line 414 until it reaches a shuttle valve 416, as shown in FIG. 4. The operation of this shuttle valve 414 will be described below.

The hydraulic valve set 220 of FIG. 4 is disposed in parallel relative to the hydraulic trailer brake valve 408. The hydraulic valve set 220 may take the form of an electrohydraulic valve set that is adjustable to produce a higher amplification pressure for older trailers. The hydraulic valve set 220 may include a first valve and a second valve. The first valve may be a pressure-controlled, proportional solenoid valve 418 that may be adjustably controlled to produce a variable outlet pressure. This valve may outlet between 0-35 bar of hydraulic pressure, although other embodiments may vary in the amount of outlet pressure from the valve. The brake controller 202, for example, may send a current to the control valve 418 to produce a desired pressure. The current may be varied so that the outlet pressure from the control valve 418 is greater than the outlet pressure of the low amplification trailer brake valve 408. The ratio across the valve set 220 may be operator controlled via the display 250. For instance, the operator may set the ratio to a defined value using the display 250, and this ratio may be communicated to the brake controller 202. This ratio may be stored by the controller 202 in a memory unit thereof. Unlike the fixed gain of the trailer brake valve 408, the operator may adjust the ratio across the hydraulic valve set 220 to a value greater than the fixed gain or any desirable pressure value. For example, if the operator disconnects a newer trailer and connects an older trailer to the tractor, the operator may adjust the valve set ratio accordingly.

The second valve may be a two-way or three-way, on/off solenoid valve 420. The valve 420 may include a solenoid 422 that is in electrical communication with the brake controller 202. The valve 420 may be biased in its open position to allow fluid to flow through the valve set 220, but if an issue arises similar to the "fail-safe" description above, the two-position valve 420 may be triggered via the brake controller 202 to its closed position, vent pressure to tank 236, and block flow through the valve set 220. In this event, brake pressure may still be fed through the low amplification hydraulic trailer brake valve 408 as described above.

As also shown in FIG. 4, a pressure transducer 424 may be positioned downstream from the valve set 220 to measure outlet pressure therefrom. This transducer 424 may correspond with transducer 224 of FIG. 2, which is in electrical communication with the brake controller 202 to continuously communicate the outlet pressure to the controller.

The operation of the second shuttle valve 416 may be similar to the first shuttle valve 218. Here, outlet pressure in line 414 from the hydraulic trailer brake valve 408 and the outlet pressure from the electrohydraulic valve set 220 in line 244 converge on the shuttle valve 416. The greater of the two pressures will pass through the shuttle valve 418 onto the hydraulic trailer brake control line 230.

Figure 5:
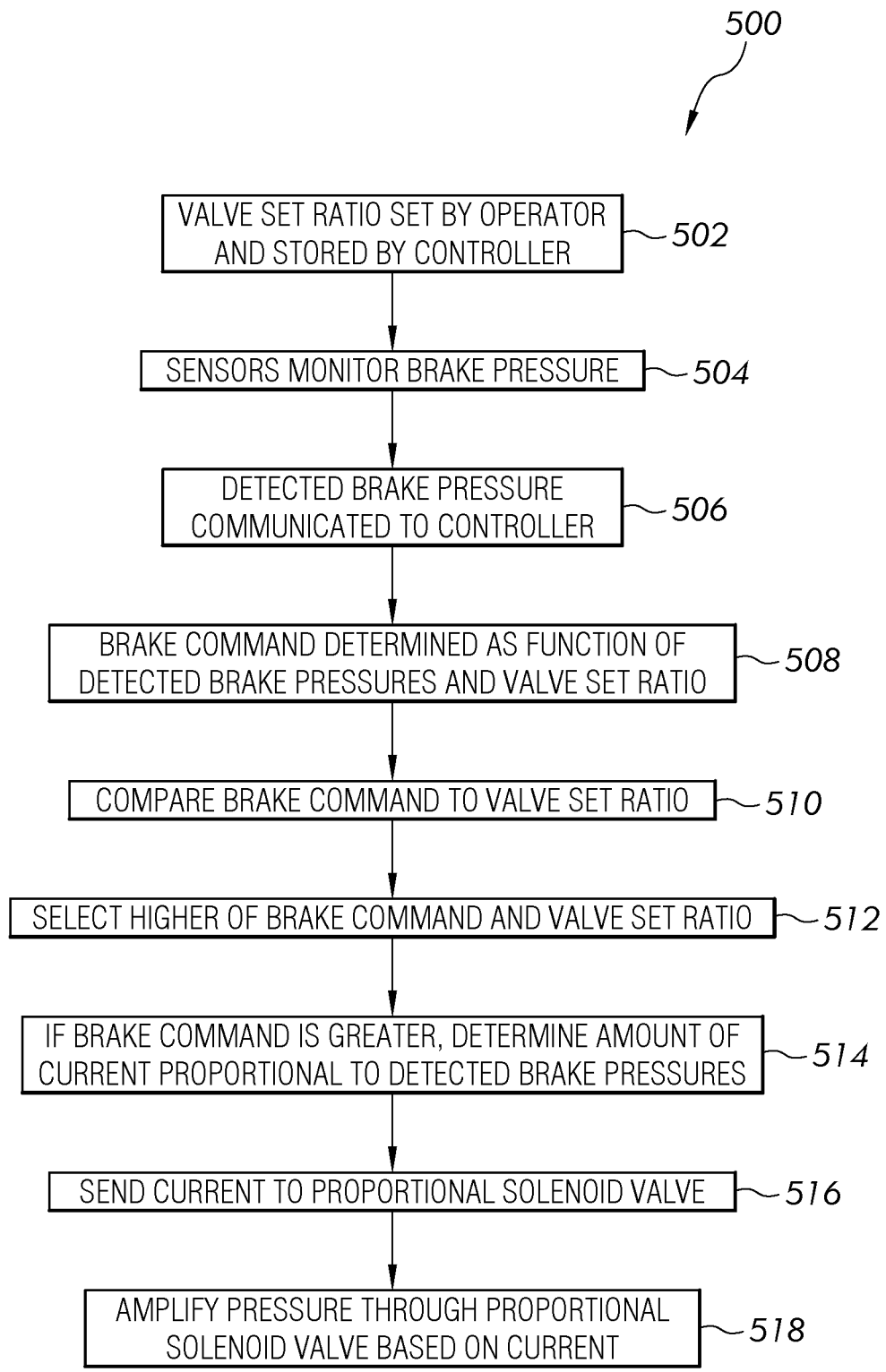
FIG. 5 is a flow diagram of a control process for controlling a combined tractor and trailer brake system.

Referring to FIG. 5, a process 500 is provided for determining the adjustable pressure that is output via the electrohydraulic valve set 220. In this process 500, a plurality of blocks or steps may be executed in order to determine the brake command to the valve set 220 to achieve a desired brake pressure. A first block 502, for example, may be executed by setting a valve set ratio. This may be done by the operator inputting a gain value into a display 250 in the cab of the tractor. In doing so, the operator may continuously adjust the valve set ratio as desired. Alternatively, the brake controller 202 or other control unit may define this value. In any event, the valve set ratio may be set or adjustably controlled in block 502.

Once block 502 is executed, the process 500 may advance to block 504 in which brake pressures are monitored by sensors. In FIG. 4, for example, a left brake pressure and a right brake pressure may be monitored by a pair of transducers 214, 216. These transducers 214, 216 are in electrical communication with the brake controller 202 so that in block 506, as brake pressure is detected, the transducers may communicate the pressures to the controller 202.

As the controller 202 receives brake pressures from the transducers or sensors, it may execute block 508 by determining a brake command as a function of the brake pressures and the valve set ratio. This may be achieved by taking an average of the brake pressures and multiplying the average by the valve set ratio. Alternatively, the controller 202 may select the maximum or minimum of the brake pressures and multiply that pressure by the valve set ratio. In a further embodiment, the controller 202 may be programmed to take a ratio of the pressures and multiply it by the valve set ratio. The manner in which the brake command is determined in block 508 may be stored in the controller and executed in the form of an algorithm or routine. As such, the result of this block may be adjustably controlled by the operator by setting the valve set ratio in block 502. It is understood that the brake command and valve set ratio may be in the form of a pressure, or may be computed or otherwise converted into a pressure command.

Once the brake command is determined in block 508, the controller 202 may compare the brake command to the valve set ratio in block 510. Based on the comparison, the controller 202 may select the greater of the two values in block 512. If the valve set ratio is the higher of the two values, then the amount of amplification via the electrohydraulic valve set 220 is determined by the operator. If, however, the brake command is greater, then the process 500 may advance to block 514 where the controller 202 may determine an amount of current that is a function of the detected brake pressures. The current may be proportional to the detected brake pressures. Alternatively, the current may be a factor or ratio of the detected pressures. A look-up table, formula, graphical data, or other known means may be used by the controller 202 to determine how much current to send to the proportional solenoid valve 418. Once the amount of current to send is determined in block 514, the brake controller 202 may communicate this current to the valve 418 in block 516 and the pressure is amplified through the valve set 220 in block 518 based on the amount of current sent by the controller 202.

In this embodiment, an operator can depress the brake pedals 204 and produce a small amount of detectable brake pressure in block 506. As a result, there may be a low or minimal amount of current sent to the valve 418, or the valve set ratio set by the operator in block 502 may be greater than the brake command such that the pressure in line 244 is based on the valve set ratio set by the operator. In any event, if there is brake pressure generated by the operator, then pressure will be received at both sides of the second shuttle valve 416.

Alternatively, the operator may slightly tap or depress the brake pedals 418 without generating any detectable brake pressure in block 506. In this instance, there may be only the pre-brake pressure from the electrohydraulic valve set 220, and this pre-brake pressure is what passes through the second shuttle valve 416 to the hydraulic trailer brake control line 230. Thus, the trailer brakes may be pre-loaded even if no brake pressure is detected in block 506 of the control process 500.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A braking system of a work machine, comprising:
   a pressurized fluid supply;
   a base valve fluidly coupled to the supply;
   a proportional control valve fluidly coupled to the supply;
   a fluid output configured to be fluidly coupled to a braking system of a trailer;
   a first fluid path selectively fluidly coupling the supply to the fluid output via the base valve;
   a second fluid path selectively fluidly coupling the supply to the fluid output via the proportional control valve;
   a shuttle valve fluidly coupled between the base valve, the proportional control valve, and the fluid output, where the shuttle valve is movable in response to a difference between a first pressure in the first flow path and a second pressure the second flow path; and
   a solenoid valve fluidly coupled between the proportional control valve and the shuttle valve;
   wherein, the base valve comprises a fixed gain and the proportional control valve comprises an adjustable gain.

2. The braking system of claim 1, wherein the solenoid valve is disposed in fluid communication between the proportional control valve, and the fluid output, where the solenoid valve is movable between an open position in which the proportional control valve is fluidly coupled to the fluid output, and a closed position in which the proportional control valve is not fluidly coupled to the fluid output.

3. The braking system of claim 2, further comprising:
   a controller; and
   a solenoid of the solenoid valve disposed in electrical communication with the controller, where movement of the solenoid valve between its open and closed positions is controlled by the controller.

4. The braking system of claim 1, further comprising:
   a controller;
   a service brake valve in fluid communication with the base valve, the service brake valve configured to provide fluid upon actuation of a service brake of the work machine;
   a sensor disposed in electrical communication with the controller, the sensor configured to detect a brake pressure from the service brake valve;
   wherein, the proportional control valve is operably controlled by the controller to provide an output pressure as a function of the brake pressure.

5. The braking system of claim 4, wherein the controller receives a valve set ratio and operably controls an output of the proportional control valve as a function of the brake pressure and valve set ratio.

6. The braking system of claim 4, wherein the controller operably controls the proportional control valve according to a variable current that is proportional to the brake pressure.

7. A braking system of a tractor trailer combination, comprising:
   a pressurized fluid supply;
   a shuttle valve disposed in fluid communication with at least two brake pressures;
   a base valve fluidly coupled to the supply, the base valve including an inlet and an outlet, where the inlet is fluidly coupled to the first shuttle valve for receiving the greater of the first brake pressure and the second brake pressure;
   a proportional control valve fluidly coupled to the supply;
   a fluid output configured to be fluidly coupled to a braking system of a trailer;
   a first fluid path selectively fluidly coupling the supply to the fluid output via the base valve; and
   a second fluid path selectively fluidly coupling the supply to the fluid output via the proportional control valve;
   Wherein, the base valve comprises a predefined, fixed gain and the proportional control valve comprises an adjustable gain.

8. The braking system of claim 7, further comprising a second shuttle valve fluidly coupled between the base valve, the proportional control valve, and the fluid output, where the shuttle valve is movable in response to a difference between a first pressure output by the base valve and a second pressure output by the proportional control valve.

9. The braking system of claim 7, further comprising a solenoid valve disposed in fluid communication between the proportional control valve and the fluid output, where the solenoid valve is movable between an open position in which the proportional control valve is fluidly coupled to the fluid output, and a closed position in which the proportional control valve is not fluidly coupled to the fluid output.

10. The braking system of claim 7, further comprising:
    a controller;
    a sensor disposed in electrical communication with the controller, the sensor configured to detect the at least two brake pressures;
    Wherein, the proportional control valve is operably controlled by the controller to provide an output pressure as a function of the at least two brake pressures.

11. The braking system of claim 10, further comprising:
    an operator display for communicating a valve set ratio to the controller;
    a first brake and a second brake of the tractor, the first brake providing a first brake pressure of the at least two brake pressures and the second brake providing a second brake pressure of the at least two brake pressures.

12. The braking system of claim 11, wherein a brake command is determined by the controller as a function of the valve set ratio, the first brake pressure and the second brake pressure.

13. The braking system of claim 12, wherein when neither the first brake or second brake produce any brake pressure, the output of the proportional control valve is based on the valve set ratio.

14. A braking system of a tractor trailer combination, comprising:
    a pressurized fluid supply;
    a first brake and a second brake of the tractor, the first brake providing a first brake pressure and the second brake providing a second brake pressure;
    a shuttle valve disposed in fluid communication with the first brake pressure and the second brake pressure;
    a base valve fluidly coupled to the supply, the base valve including an inlet and an outlet, where the inlet is fluidly coupled to the shuttle valve for receiving the greater of the first brake pressure and the second brake pressure;
a proportional control valve fluidly coupled to the supply;
a fluid output configured to be fluidly coupled to a braking system of a trailer;
a first fluid path selectively fluidly coupling the supply to the fluid output via the base valve; and
a second fluid path selectively fluidly coupling the supply to the fluid output via the proportional control valve;
wherein, the base valve comprises a fixed gain and the proportional control valve comprises an adjustable gain.

15. The braking system of claim 14, further comprising a second shuttle valve fluidly coupled between the base valve, the proportional control valve, and the fluid output, where the shuttle valve is movable in response to a difference between a first pressure output by the base valve and a second pressure output by the proportional control valve.

16. The braking system of claim 14, further comprising a solenoid valve disposed in fluid communication between the proportional control valve the fluid output, where the solenoid valve is movable between an open position in which the proportional control valve is fluidly coupled to the fluid output, and a closed position in which the proportional control valve is not fluidly coupled to the fluid output.

17. The braking system of claim 14, further comprising:
a controller;
a sensor disposed in electrical communication with the controller, the sensor configured to detect the first and second brake pressures;
wherein, the proportional control valve is operably controlled by the controller to provide an output pressure as a function of the first and second brake pressures.

18. The braking system of claim 17, further comprising an operator display for communicating a valve set ratio to the controller;
wherein, a brake command is determined by the controller as a function of the valve set ratio, the first brake pressure, and the second brake pressure.

19. The braking system of claim 18, wherein, when neither the first brake or second brake produce any brake pressure, the output of the proportional control valve is based on the valve set ratio.

\* \* \* \* \*